O. C. Phelps,
Water Filter,
Nº 13,070. Patented June 12, 1855.
Fig: 1.
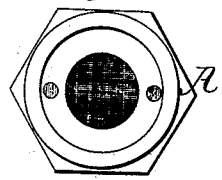
Fig: 2.
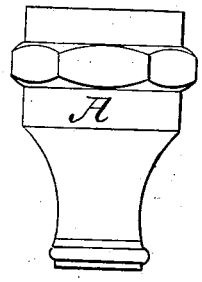
Fig: 3.
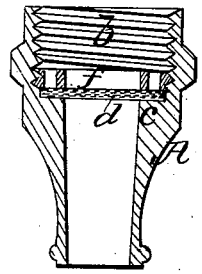
Fig: 4.
N. PETERS, PHOTO-LITHOGRAPHER, WASHINGTON, D. C.

UNITED STATES PATENT OFFICE.

ORSON C. PHELPS, OF BOSTON, MASSACHUSETTS, ASSIGNOR TO O. C. PHELPS AND JOHN HOLTON.

METALLIC MEDIUM FOR FILTERING.

Specification of Letters Patent No. 13,070, dated June 12, 1855.

*To all whom it may concern:*

Be it known that I, ORSON C. PHELPS, of Boston, in the county of Suffolk and State of Massachusetts, have invented a new and useful Improvement in Water-Filters, of which the following is a full, clear, and exact description, reference being had to the annexed drawings, in which—

Figure 1, is a plan; Fig. 2, an elevation; Fig. 3, a section through a filter with my improvements attached; Fig. 4, a disk of the rolled wire gauze which constitutes my filtering medium.

In the filters now most commonly in use, the water is made to pass through a body of pulverized quartz, charcoal, or other suitable material, which arrest the animalcula and other impurities which it contains. To a certain extent such filters may be cleansed by forcing the water through them in a reverse direction; but more or less of the impurities find their way into the center of the filtering material, and can only be dislodged by entirely reconstructing the filter or at least by repacking the material with which it is filled. The impurities thus left in the filter soon decompose and render the water offensive, which it is designed to purify.

My invention has for its object the discovery of a filtering material which shall be free from the above objections, and at the same time shall be effective, economical and easily and quickly cleansed by those having it in charge.

My invention consists in the use of fine wire gauze prepared in a manner which I will now describe.

The gauze is first passed through metallic rolls under a sufficient pressure to flatten the wire of which it is composed, by which means the interstices between the wires are very much reduced—and the material is made to resemble a thin sheet of metal perforated uniformly with very minute holes.

To enable others skilled in the art to make use of the material so prepared I will proceed to describe the manner in which I have constructed my filter.

A is the nozzle which is secured to the "bib" by the screw $b$. Within this nozzle and upon the shoulder $c$ is laid the rolled wire gauze cut into disks $d$, Figs. 3 and 4 of a suitable size, which are secured in place by a nut $f$ adapted to the screw $b$. It is found that from three to six thicknesses of the gauze thus prepared according to the pressure upon the water in the pipes form a most economical and efficient filter, at the same time that it may be instantaneously cleansed by washing, without expense and without the necessity of renewing or replacing the filtering material, and when the latter becomes worn by use and requires to be replaced, this may be readily effected by taking out the screw $f$ and inserting new disks of gauze.

I do not claim rolling wire gauze by passing it between metallic rolls—neither do 1 claim the use of wire gauze as a filtering material when the same is unprepared in the manner herein described, but What I do claim as my invention and desire to secure by Letters Patent is—

The use of disks of rolled wire gauze prepared and applied to the filter in the manner substantially as set forth.

ORSON C. PHELPS.

Witnesses:
SAM COOPER,
JOHN S. CLOW.